(12) United States Patent
Grecco et al.

(10) Patent No.: US 9,055,122 B2
(45) Date of Patent: *Jun. 9, 2015

(54) COLLECTING AND ASSOCIATING PROFILE DATA OF A USER OF A MOBILE DEVICE TO EVENTS OF THE MOBILE DEVICE USING A UNIQUE INDIVIDUAL IDENTIFICATION NUMBER

(75) Inventors: Barbara Grecco, Seattle, WA (US); Ronald J. Craswell, Redmond, WA (US)

(73) Assignee: comScore, Inc., Reston, VA (US)

(*) Notice: Subject to any disclaimer, the term of this patent is extended or adjusted under 35 U.S.C. 154(b) by 313 days.

This patent is subject to a terminal disclaimer.

(21) Appl. No.: 12/961,092

(22) Filed: Dec. 6, 2010

(65) Prior Publication Data

US 2011/0078279 A1    Mar. 31, 2011

Related U.S. Application Data

(63) Continuation of application No. 11/183,339, filed on Jul. 18, 2005, now Pat. No. 7,849,154.

(60) Provisional application No. 60/694,451, filed on Jun. 27, 2005.

(51) Int. Cl.
  *G06F 15/16* (2006.01)
  *G06F 15/173* (2006.01)
  (Continued)

(52) U.S. Cl.
  CPC .............. *H04L 67/34* (2013.01); *H04W 24/00* (2013.01); *G06Q 30/02* (2013.01); *G06Q 30/0269* (2013.01); *H04W 8/18* (2013.01); *H04L 67/306* (2013.01)

(58) Field of Classification Search
  CPC ....... H04W 24/00; H04W 8/18; G06Q 30/02; G06Q 30/0269; H04L 67/306; H04L 67/34
  USPC .................. 709/217, 224; 455/407; 705/14.66
  See application file for complete search history.

(56) References Cited

U.S. PATENT DOCUMENTS

| 5,603,084 | A | | 2/1997 | Henry et al. | |
| 5,717,923 | A | * | 2/1998 | Dedrick | ................................ 1/1 |

(Continued)

FOREIGN PATENT DOCUMENTS

| WO | WO 01/11507 A1 | * | 2/2001 | |
| WO | WO 2005071961 A1 | * | 8/2005 | ............... H04N 7/16 |

OTHER PUBLICATIONS

Office Action issued in U.S. Appl. No. 11/903,089 dated Dec. 28, 2009, 14 pages.

(Continued)

*Primary Examiner* — Daniel C Murray
(74) *Attorney, Agent, or Firm* — Fish & Richardson P.C.

(57) ABSTRACT

A system to collect personal and demographic data from user's of cellular mobile communications system devices. This system uses a standard web browser to collect the personal and demographic data instead of the device itself because of the limited interactive experience available to cellular mobile communications system device users. After obtaining data from the user including the user's cellular mobile communications system device's cellular phone number, a message is sent to the device. When a link is the message is activated a small event collection data software module is downloaded to the cellular mobile communications system device. The return message to the data collection entity incorporates the cellular mobile communications system device's International Mobile Equipment Identifier (IMEI) number. This number then ties the event data collected by the module to the personal and demographic information collected from the cellular mobile communications system device user.

12 Claims, 5 Drawing Sheets

(51) Int. Cl.
*G06Q 30/00* (2012.01)
*H04M 11/00* (2006.01)
*H04L 29/08* (2006.01)
*G06Q 30/02* (2012.01)
*H04W 24/00* (2009.01)
*H04W 8/18* (2009.01)

(56) References Cited

U.S. PATENT DOCUMENTS

| | | | |
|---|---|---|---|
| 5,754,953 A * | 5/1998 | Briancon et al. | 455/418 |
| 5,768,521 A * | 6/1998 | Dedrick | 709/224 |
| 5,857,190 A | 1/1999 | Brown | |
| 6,016,509 A * | 1/2000 | Dedrick | 709/224 |
| 6,141,010 A * | 10/2000 | Hoyle | 715/854 |
| 6,493,327 B1 | 12/2002 | Fingerhut | |
| 6,622,116 B2 | 9/2003 | Skinner et al. | |
| 6,628,314 B1 * | 9/2003 | Hoyle | 715/854 |
| 6,714,778 B2 | 3/2004 | Nykänen et al. | |
| 6,721,578 B2 * | 4/2004 | Minear et al. | 455/566 |
| 6,771,290 B1 * | 8/2004 | Hoyle | 715/745 |
| 6,939,233 B2 | 9/2005 | Emmerson | |
| 7,003,792 B1 * | 2/2006 | Yuen | 725/46 |
| 7,065,388 B2 * | 6/2006 | Minear et al. | 455/566 |
| 7,224,974 B2 | 5/2007 | Benco et al. | |
| 7,336,964 B2 * | 2/2008 | Casey | 455/456.3 |
| 7,366,996 B2 * | 4/2008 | Hoyle | 715/854 |
| 7,412,232 B2 * | 8/2008 | Wilson et al. | 455/418 |
| 7,502,367 B2 | 3/2009 | Becher et al. | |
| 7,506,059 B2 | 3/2009 | Mulligan | |
| 7,536,718 B2 * | 5/2009 | Wilson et al. | 726/13 |
| 7,587,473 B2 | 9/2009 | Benco et al. | |
| 7,599,681 B2 * | 10/2009 | Link et al. | 455/411 |
| 7,685,537 B2 * | 3/2010 | Hoyle | 715/854 |
| 7,694,874 B2 * | 4/2010 | Narasimhan et al. | 235/375 |
| 7,729,940 B2 * | 6/2010 | Harvey et al. | 705/7.31 |
| 7,894,847 B2 * | 2/2011 | Kuhn | 455/550.1 |
| 7,917,440 B2 * | 3/2011 | Lau et al. | 705/52 |
| 7,941,515 B2 * | 5/2011 | Ladd et al. | 709/223 |
| 8,001,615 B2 * | 8/2011 | Ksontini et al. | 726/29 |
| 8,005,922 B2 * | 8/2011 | Boudreau et al. | 709/217 |
| 8,023,882 B2 * | 9/2011 | Croy et al. | 455/2.01 |
| 8,140,515 B2 * | 3/2012 | Pradhan et al. | 707/711 |
| 8,175,645 B2 * | 5/2012 | Evans et al. | 455/557 |
| 8,214,346 B2 * | 7/2012 | Pradhan et al. | 707/706 |
| 8,234,263 B2 * | 7/2012 | Pradhan et al. | 707/706 |
| 8,315,620 B1 * | 11/2012 | Williamson et al. | 455/418 |
| 8,452,352 B2 * | 5/2013 | Kothari et al. | 455/574 |
| 8,467,717 B2 * | 6/2013 | Croy et al. | 455/2.01 |
| 8,539,527 B2 * | 9/2013 | Wright et al. | 725/46 |
| 8,549,410 B2 * | 10/2013 | Hoyle | 715/745 |
| 8,549,411 B2 * | 10/2013 | Hoyle | 715/745 |
| 8,756,657 B2 * | 6/2014 | Bijlsma | 726/3 |
| 8,769,440 B2 * | 7/2014 | Hoyle | 715/854 |
| 2001/0037407 A1 | 11/2001 | Dragulev et al. | |
| 2001/0052077 A1 | 12/2001 | Fung et al. | |
| 2002/0029267 A1 | 3/2002 | Sankuratripati et al. | |
| 2002/0143961 A1 | 10/2002 | Siegel et al. | |
| 2002/0160752 A1 * | 10/2002 | Hook et al. | 455/412 |
| 2003/0041125 A1 * | 2/2003 | Salomon | 709/220 |
| 2003/0065777 A1 | 4/2003 | Mattila et al. | |
| 2003/0074400 A1 | 4/2003 | Brooks et al. | |
| 2003/0093311 A1 | 5/2003 | Knowlson | |
| 2003/0233336 A1 * | 12/2003 | Clark | 707/1 |
| 2003/0233461 A1 * | 12/2003 | Mariblanca-Nieves et al. | 709/228 |
| 2004/0039814 A1 | 2/2004 | Crabtree et al. | |
| 2004/0068502 A1 | 4/2004 | Vogedes et al. | |
| 2004/0103142 A1 | 5/2004 | Becher et al. | |
| 2004/0186882 A1 | 9/2004 | Ting | |
| 2004/0198234 A1 | 10/2004 | Wacker et al. | |
| 2005/0005242 A1 * | 1/2005 | Hoyle | 715/745 |
| 2005/0148335 A1 | 7/2005 | Benco et al. | |
| 2005/0213511 A1 * | 9/2005 | Reece et al. | 370/252 |
| 2005/0213544 A1 | 9/2005 | Kikuchi et al. | |
| 2006/0154601 A1 * | 7/2006 | Tewalt et al. | 455/12.1 |
| 2006/0168250 A1 | 7/2006 | Feng et al. | |
| 2006/0277271 A1 | 12/2006 | Morse et al. | |
| 2006/0277308 A1 | 12/2006 | Morse et al. | |
| 2007/0011040 A1 * | 1/2007 | Wright et al. | 705/10 |
| 2007/0015521 A1 * | 1/2007 | Casey | 455/456.3 |
| 2007/0073799 A1 | 3/2007 | Adjali et al. | |
| 2007/0203791 A1 * | 8/2007 | Kohl et al. | 705/14 |
| 2007/0288543 A1 * | 12/2007 | Evans et al. | 709/200 |
| 2008/0021833 A1 * | 1/2008 | Lau et al. | 705/51 |
| 2008/0261572 A1 * | 10/2008 | Tsui et al. | 455/414.2 |
| 2008/0276270 A1 * | 11/2008 | Kotaru et al. | 725/34 |
| 2008/0288874 A1 * | 11/2008 | Hoyle | 715/738 |
| 2009/0259518 A1 * | 10/2009 | Harvey et al. | 705/10 |
| 2009/0292799 A1 * | 11/2009 | Eisener et al. | 709/223 |
| 2009/0319329 A1 * | 12/2009 | Aggarwal et al. | 705/10 |
| 2009/0327243 A1 * | 12/2009 | Pradhan et al. | 707/3 |
| 2010/0114705 A1 * | 5/2010 | Hoyle | 705/14.54 |
| 2010/0131507 A1 * | 5/2010 | Pradhan et al. | 707/737 |
| 2010/0145791 A1 * | 6/2010 | Canning et al. | 705/14.41 |
| 2010/0161492 A1 * | 6/2010 | Harvey et al. | 705/50 |
| 2011/0066615 A1 * | 3/2011 | Pradhan et al. | 707/737 |
| 2011/0078762 A1 * | 3/2011 | Bijlsma | 726/3 |
| 2011/0126222 A1 * | 5/2011 | Wright et al. | 725/14 |
| 2011/0173321 A1 * | 7/2011 | Lau et al. | 709/224 |
| 2011/0208582 A1 * | 8/2011 | Hoyle | 705/14.49 |
| 2012/0158512 A1 * | 6/2012 | Hoyle | 705/14.64 |
| 2012/0302222 A1 | 11/2012 | Williamson et al. | 455/418 |
| 2013/0013405 A1 * | 1/2013 | Hoyle | 705/14.53 |
| 2013/0013410 A1 * | 1/2013 | Hoyle | 705/14.54 |
| 2013/0072150 A1 * | 3/2013 | Williamson et al. | 455/405 |
| 2013/0124309 A1 * | 5/2013 | Traasdahl et al. | 705/14.49 |
| 2013/0191391 A1 * | 7/2013 | Pradhan et al. | 707/737 |
| 2013/0226642 A1 * | 8/2013 | Mani et al. | 705/7.15 |
| 2013/0226857 A1 * | 8/2013 | Shim et al. | 706/52 |
| 2014/0149227 A1 * | 5/2014 | Hoyle | 705/14.66 |
| 2014/0304212 A1 * | 10/2014 | Shim et al. | 706/52 |

OTHER PUBLICATIONS

U.S. Appl. No. 11/903,089, filed Sep. 20, 2007.

\* cited by examiner

| PROFILE | % DOWNLOADED A GAME PAST 6 MO. | % DOWNLOADED RING TONE LAST 6 MO. | % REQUESTED WEATHER FORECAST LAST 6 MO. | % REQUESTED SPORTS SCORES LAST 6 MO. | % PURCHASED GOODS LAST 6 MO. |
|---|---|---|---|---|---|
| MALE AGE < 25 INCOME < 30K | 45 | 36 | 22 | 87 | 5 |
| MALE AGE > 25 < 35 INCOME > 50K | 55 | 48 | 33 | 24 | 32 |
| MALE AGE > 35 < 45 INCOME > 60K | 35 | 43 | 36 | 67 | 48 |
| MALE AGE > 45 INCOME > 50K | 12 | 24 | 34 | 35 | 38 |
| MALE AGE > 45 INCOME > 75K | 8 | 13 | 23 | 26 | 54 |
| MALE ALL AGES ALL INCOMES | 38 | 55 | 12 | 18 | 22 |

*FIG.5*

COLLECTING AND ASSOCIATING PROFILE DATA OF A USER OF A MOBILE DEVICE TO EVENTS OF THE MOBILE DEVICE USING A UNIQUE INDIVIDUAL IDENTIFICATION NUMBER

CROSS-REFERENCE TO RELATED APPLICATIONS

This application is a continuation of U.S. application Ser. No. 11/183,339, filed on Jul. 18, 2005, and titled "Acquiring, Storing and Correlating Profile Data of Cellular Mobile Communications System's Users to Events," which claims priority to U.S. Provisional Application Ser. No. 60/694,451, filed on Jun. 27, 2005, and titled "Acquiring, Storing, and Correlating Profile Data of Cellular Mobile," all of which are incorporated by reference.

BACKGROUND

1. Field

The present invention relates to the collecting of personal information including demographic data (user's profile), of a cellular mobile communications system (CMCS) device's user and then monitoring and correlating that user's CMCS events to that user's profile. The events tracked may include standard cell phone events that the CMCS device is capable of, such as receiving and sending standard cell phone calls to another person or persons. The events tracked may also include the receiving and sending of short text messages (SMS), the receiving and sending of enhanced messages (EMS), or the receiving and sending of multimedia messages (MMS). Other events that may be monitored and correlated to the CMCS user profile include downloading games from the CMCS carrier, downloading ring tones, receiving and sending instant messages (IM), the receipt of "push" notifications, downloading web pages that may include, among other things, sports scores, weather forecasts, stock quotes and movie listings. The movie listings may be localized for the area from the area that CMCS device is being used or from another geographic area. Other events may include viewing advertisements and making purchases. The number of different activities and uses that a CMCS is capable of is continually increasing. The present invention is capable of capturing these future activities and usages (events) and correlating said events to the profile recorded for the CMCS device's user.

2. Description of Related Art

To determine how a CMCS device is used by a person, from whom voluntary and permissible profile data has been obtained, can be important information to the provider of services for the CMCS industry. Using techniques such as having the user fill out survey forms or keep a written log of phone usage or even sending inquiries via microbrowser enabled web pages are all subject to error due to incompleteness, user time constraints or forgetfulness. Although metering software, tracking CMCS usage, that is embedded in a CMCS operating system (OS) is well known in the art, what is needed is a method of collecting rich and complete profile data from a CMCS device user, whereby such collection does not require the use of the CMCS device to input that profile data. The reason to not use a CMCS device to collect the profile data is that a CMCS device is limited in how the interaction experience occurs. But to still be able to maintain the capability of correlating that personal and demographic data of the user to the usage of a particular CMCS device is important even though the user profile information was not obtained by the use of the CMCS device. The presently explained method of capturing a user's profile data via a fully featured web browser, making the user's experience less onerous than trying to collect the same rich profile data via the limited capability browsers available in most CMCS devices, is unique in the industry. Trying to initially acquire such profile data from the CMCS user using a CMCS device can be time consuming and many times frustrating due to the limitations of interaction often inherent in CMCS devices. These limitations include small viewing screen size, small or non-existent keyboards, cost of the cell time used, latency of the network, and limited information contained in the decks presented to the user. Therefore the need is to have the capability of obtaining rich demographic data from a CMCS device user and being able to seamlessly tie that data to the particular CMCS device whereupon the event activities that the CMCS device is engaged in are captured and related back to that specific user.

The demographic, lifestyle and even perhaps psychological profiles of the CMCS user can be easily captured using the present invention. Besides the typical demographic data such as age, sex, income, political affiliation and residence address; personal lifestyle data can also be requested, such as magazines subscribed to, favorite hobbies, favorite authors, type of vehicle/s owned, vacations contemplated, TV viewing habits, and stores shopped at. A third area of inquiry may even include a short psychological questionnaire relating to personality aspects of the CMCS device's user. An example of this aspect is a measure of the user's patience. This may be important to know because the information presented to the CMCS user may be richer and therefore slower to download or briefer and more quickly downloaded.

The ultimate consumers of the correlated personal and demographic data with the usage of the CMCS device may desire that even more profile data be obtained from a segment of the population from whom data has already been collected. By having the email addresses, obtained in the course of implementing the present invention, of those segments of profiled persons the information consumer is interested in, those segments may then be asked additional questions related to the ultimate information consumer's interest.

The present invention disclosed accomplishes these tasks.

BRIEF SUMMARY OF THE INVENTION

In accordance with the present invention a method is presented for collecting personal information from a cellular mobile communications system device's user by collecting said personal information, including the cellular mobile communications system device's cellular phone number, via a form displayed upon a standard web browser of the cellular mobile communications system device's user's computer, said form retrieved from the information requesting entity's website. Then by sending a message to the cellular mobile communications system device's cellular phone number addressed to the user, said message, when responded to, causes a downloading of a device metering software module to the cellular mobile communications system's device. When the device returns the message to the information requesting entity's server, the message contains the International Mobile Equipment Identifier (IMEI) number of the cellular mobile communications system device. The device metering software then collects information as to how the user is using the device and that information is transmitted to the collecting entity and cross referenced to the profile data provided by the user, thereby giving a correlation between the user's profile data to how the CMCS device is used (device event data). This information allows device content providers and device manufacturers valuable insights information on how the device and content is used by certain segments of the population.

BRIEF DESCRIPTION OF THE DRAWINGS

The invention is further described in connection with the accompanying drawings, in which:

FIG. 5 shows how a user profile may be correlated to how the CMCS device is used.

PREFERRED EMBODIMENT

Figure 1:
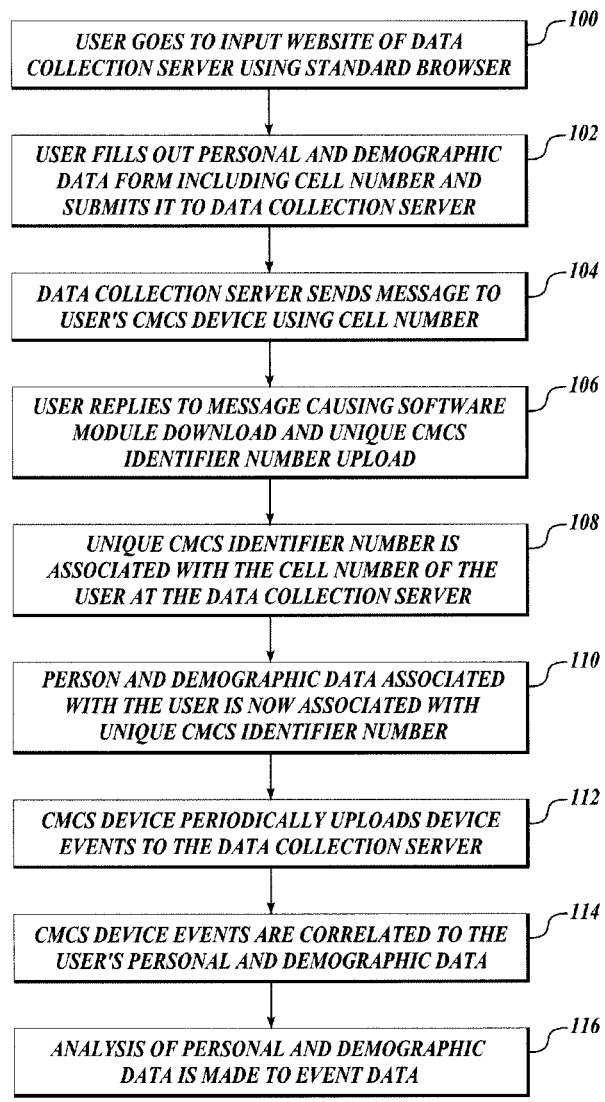
FIG. 1 is a flowchart showing steps taken to correlate event data to user.
Figure 2:
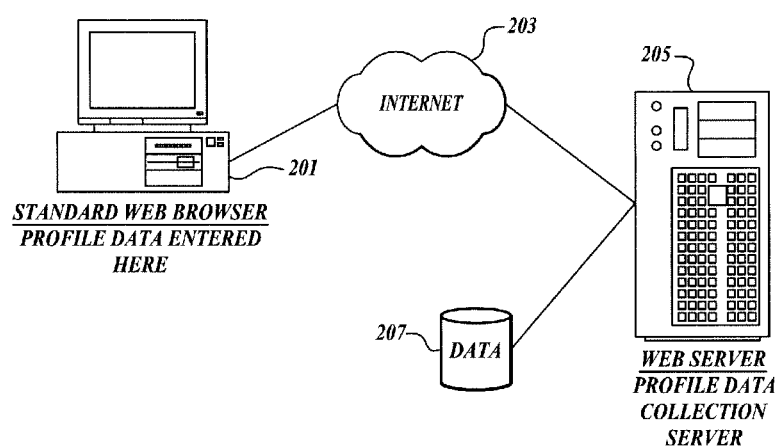
FIG. 2 shows the user inputting data over the Internet to a data collection server via a full service browser.
Figure 3:
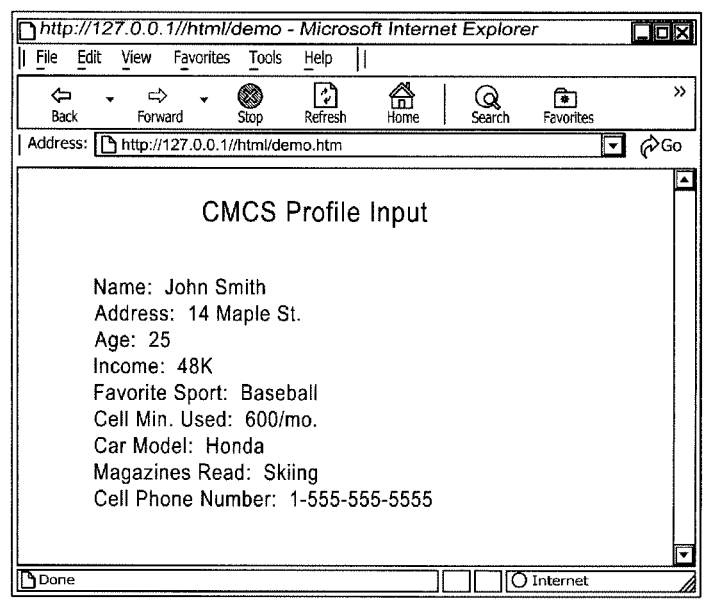
FIG. 3 shows a partially completed database record of the user's profile.

Using FIG. 1 a flowchart shows the preferred embodiment of the present invention. The user goes to the website set up to collect the user's profile data 100 and fills out a form collecting this data 102. The data collection server using the cell phone number provided by the user sends a message to the CMCS device 104. The user replies to the message whereupon the data collection server downloads its event collection software to the CMCS device 106. The CMCS device, now with the software loaded, sends to the data collection server a message that includes the cell phone number and a unique device individual identification number 108. The user's profile data is then associated with the unique individual identification number 110. Upon meeting a predetermined criteria the embedded software module that has been tracking the various events of the CMCS device transmits that event data back to the data collection server 112. The event data collected may be then correlated to the profile data collected from the user 114 and analyzed 116 In FIG. 2 the rich demographic data is shown as being obtained via use of a standard web browser 201 shown in FIG. 2. The user goes to the standard web browser as found on most desktop and laptop computers and enters the URL (Uniform Resource Locater) of the personal and demographic data gathering website server, as shown in 205, the URL being set up by the entity desiring to correlate CMCS device use to a particular user's personal and demographic profile data. The user fills out personal and demographic data as show in FIG. 3, on a webpage form and also provides to the data collection site the CMCS device's cell phone number as is requested. The personal and demographic data may include but is not limited to: address, income bracket, education level, age, home ownership, club or association affiliations, sex, occupation, hobbies, sports, electronic devices owned, potential future purchasing decisions, political affiliation. The information may be encrypted or unencrypted and then transmitted to the data collection server, either compressed or uncompressed, associated with the demographic data gathering URL. The data collection server stores this information in a database 207 which later correlates this profile data to the CMCS's type of events recorded data. Along with the personal and demographic data the database also contains the user's regular Internet email address. This allows update requests to be made to the user via regular email that can contain an embedded link to an updating server. This update server can request and capture personal and demographic data changes that may have occurred since the last user profile survey.

Figure 4:
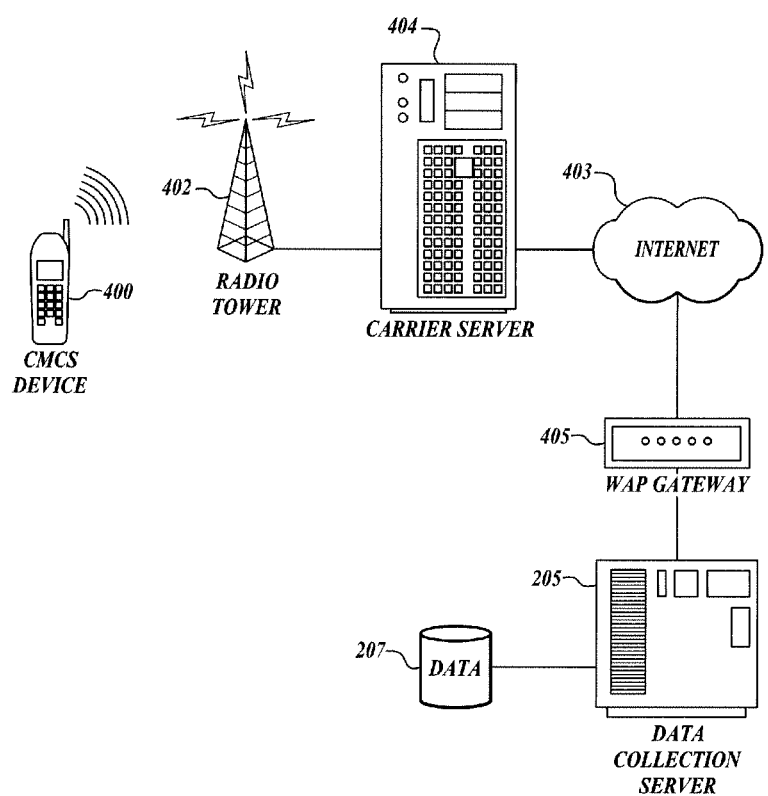
FIG. 4 shows a schematic of the downloading of events that were recorded and saved on the CMCS device to the data collection server.

FIG. 4 shows a typical CMCS device 400 transmitting to a cell tower 402 which, in turn, transmits to the server of the cell phone carrier 404. The carrier server uses the Internet 403 to connect to a data collection server 205 using a WAP gateway 405. The data collection server saves this information in its database 207. The CMCS device utilizes a small embedded software module in the CMCS's operating system wherein the module was downloaded from a data collection server. The software module contains a metering and notification method for capturing CMCS device events and sending a listing of the types of events to the data collection server. The software is capable of capturing all events the CMCS is engaged in. The events captured by the metering and notification software may also be restricted to a subset of all the events the CMCS device is capable of. The metering and notification software records in device memory said selected events occurring between the time of the last download of events and the time of a current download from the CMCS's memory. That information is then correlated to the rich personal and demographic data of the CMCS device's user that was previously captured.

After the CMCS device's user fills out the required personal and demographic data using an encrypted server and confirms permission requested by the data collection server to collect event data from the CMCS device, the data collection server 205 then, using the cell phone number provided by the user, sends a Wireless Application Protocol (WAP) push message through the WAP gateway 405, over the Internet to the carrier server of the CMCS device and then to the CMCS device 400 as shown in FIG. 4 or, in the alternative, sends a short text message (SMS) to the CMCS device using the same route. The user then initiates the downloading of a small footprint device event metering software module to the CMCS device by responding to the WAP or SMS message. The device event metering software is then installed in the CMCS device. The now embedded device event metering software captures the CMCS's unique individual identification number and sends an SMS or other type of message containing that number to the server. One type of a CMCS device's unique individual identification number is its IMEI number (International Mobile Equipment Identifier). This is a 15-digit number (composed of four parts) that uniquely identifies an individual wireless device. The IMEI captured by the device event metering software is transmitted by the CMCS device over the cell phone network every time the event data is uploaded to the data collection server. The IMEI number is used to correlate the user's profile to the CMCS device events recorded in the database 207 because the IMEI number is a number integrally associated with the CMCS device. The CMCS device cell phone number is associated with the user's account with the carrier and is often difficult to ascertain. The CMCS device itself may not know its cell number and even when it does know its own number the Application Programming Interface (API) call to obtain that number may be privileged and only specific carrier-approved applications may have access to it. The IMEI number on the other hand, is easily accessible via a programmatic interface. Other types of individual unique identifiers of the CMCS device may also be used.

The server then correlates the IMEI number to the rich demographic data stored in the database by matching the CMCS device's cell number, that was provided by the user during the demographic data collection, to the cell number enclosed in the "From:" address line on the SMS return message. The result is a correlation of the user's rich personal and demographic data to the particular CMCS device and therefore to the events metered and sent to the data collection server during the intervening CMCS device's use since the last upload. FIG. 4 shows one method to sort and display one type of personal and demographic data correlated to several types of CMCS device events.

The metering and notification software module, besides being self-installing, has the capability to compress and encrypt the data collected during CSMS device's use. The software is also capable of determining when to download the event data collected to the collection server, depending on various selectable criteria such as memory capacity used, predetermined time intervals or other triggering events. The preferred embodiment of the present invention downloads the event history to the data collection server following the well-known HTTP or HTTPS data transmission protocol. Alternative embodiments of downloading the event data may include the use of SMS messages or email. Every download of event data will include the CMCS device's individual identification number to correlate the CMCS device's events with the user's personal and demographic data.

Although the invention has been described as setting forth specific embodiments thereof, the invention is not limited thereto. Changes in the details may be made within the spirit and the scope of the invention, said spirit and scope to be construed broadly and not to be limited by specific examples and terminology used.

We claim:

1. A method for collecting and associating profile data of a user of a mobile device to events of the mobile device, the method comprising:

collecting profile data of a user, including a phone number of a mobile device of the user and demographic data associated with the user, via a form displayed on a web browser, the form being retrieved from a system associated with an information requesting entity;

creating, in a system associated with the information requesting entity, a profile for the user based on the collected profile data, the profile being identified in part by the phone number of the mobile device of the user;

in response to collecting the profile information, including the phone number, sending a message to the mobile device associated with the collected phone number, wherein the sent message, when interacted with by the user, results in a downloading of a device metering software module to the mobile device;

after downloading and installation of the device metering software module by the mobile device, receiving, from the mobile device and at a system associated with the information requesting entity, a message containing the phone number of the mobile device of the user and a unique individual identification number integrally associated with the mobile device, the phone number and the unique individual identification number being different;

locating, amongst multiple profiles stored in a system associated with the information requesting entity, a profile associated with the phone number included in the received message;

associating, in a system associated with the information requesting entity, the unique individual identification number with the located profile associated with the phone number included in the received message, the association of the unique individual identification number with the located profile enabling the located profile to be identified by the unique individual identification number;

receiving, from the mobile device and at a system associated with the information requesting entity, information indicative of events associated with the use of the mobile device, the information including the unique individual identification number;

locating, amongst multiple profiles stored in a system associated with the information requesting entity, a profile associated with the unique individual identification number included in the received information; and associating, the received information with the located profile associated with the unique individual identification number included in the received information, wherein the unique individual identification number is based on an International Mobile Equipment Identifier (IMEI) number associated with the mobile device.

2. The method as in claim 1 wherein the collected profile data is encrypted and compressed, such that collecting profile data of a user, including a phone number of a mobile device of the user, via a form displayed on a web browser comprises receiving encrypted and compressed profile data of a user, including a phone number of a mobile device of the user, via a form displayed on a web browser.

3. The method as in claim 1 wherein receiving information indicative of events associated with the use of the mobile device is dependent upon a predetermined criteria being met.

4. The method as in claim 1 further comprising gaining permission from the user to download the device metering software module to the mobile device.

5. One or more non-transitory computer-usable storage mediums storing one or more computer programs for collecting and associating profile data of a user of a mobile device to events of the mobile device, the computer programs comprising instructions which, when executed, cause one or more computers to perform the following operations:

collect profile data of a user, including a phone number of a mobile device of the user and demographic data associated with the user, via a form displayed on a web browser, the form being retrieved from a system associated with an information requesting entity;

create, in a system associated with the information requesting entity, a profile for the user based on the collected profile data, the profile being identified in part by the phone number of the mobile device of the user;

in response to the collection of the profile information, including the phone number, send a message to the mobile device associated with the collected phone number, wherein the sent message, when interacted with by the user, results in a download of a device metering software module to the mobile device;

after downloading and installation of the device metering software module by the mobile device, receive, from the mobile device and at a system associated with the information requesting entity, a message containing the phone number of the mobile device of the user and a unique individual identification number integrally associated with the mobile device, the phone number and the unique individual identification number being different;

locate, amongst multiple profiles stored in a system associated with the information requesting entity, a profile associated with the phone number included in the received message;

associate, in a system associated with the information requesting entity, the unique individual identification number with the located profile associated with the phone number included in the received message, the association of the unique individual identification number with the located profile enabling the located profile to be identified by the unique individual identification number;

receive, from the mobile device and at a system associated with the information requesting entity, information indicative of events associated with the use of the mobile device, the information including the unique individual identification number;

locate, amongst multiple profiles stored in a system associated with the information requesting entity, a profile associated with the unique individual identification number included in the received information; and associate, the received information with the located profile associated with the unique individual identification number included in the received information, wherein the unique individual identification number is based on an International Mobile Equipment Identifier (IMEI) number associated with the mobile device.

6. The one or more non-transitory computer-usable storage mediums as in claim 5 wherein the collected profile data is encrypted and compressed, such that, to collect profile data of a user, including a phone number of a mobile device of the user, via a form displayed on a web browser, the computer programs comprise instructions which, when executed, cause the one or more computers to receive encrypted and compressed profile data of a user, including a phone number of a mobile device of the user, via a form displayed on a web browser.

7. The one or more non-transitory computer-usable storage mediums as in claim 5 wherein the operation to receive information indicative of events associated with the use of the mobile device is dependent upon a predetermined criteria being met.

8. The one or more non-transitory computer-usable storage mediums as in claim 5 wherein the computer programs further comprise instructions which, when executed, cause the one or more computers to receive permission from the user to download the device metering software module to the mobile device.

9. A system operable to collect and associate profile data of a user of a mobile device to events of the mobile device, the system comprising:

one or more servers configured to:

collect profile data of a user, including a phone number of a mobile device of the user and demographic data associated with the user, via a form displayed on a web browser, the form being retrieved from a system associated with an information requesting entity;

create, in a system associated with the information requesting entity, a profile for the user based on the collected profile data, the profile being identified in part by the phone number of the mobile device of the user;

in response to the collection of the profile information, including the phone number, send a message to the mobile device associated with the collected phone number, wherein the sent message, when interacted with by the user, results in a download of a device metering software module to the mobile device;

after downloading and installation of the device metering software module by the mobile device, receive, from the mobile device and at a system associated with the information requesting entity, a message containing the phone number of the mobile device of the user and a unique individual identification number integrally associated with the mobile device, the phone number and the unique individual identification number being different;

locate, amongst multiple profiles stored in a system associated with the information requesting entity, a profile associated with the phone number included in the received message;

associate, in a system associated with the information requesting entity, the unique individual identification number with the located profile associated with the phone number included in the received message, the association of the unique individual identification number with the located profile enabling the located profile to be identified by the unique individual identification number;

receive, from the mobile device and at a system associated with the information requesting entity, information indicative of events associated with the use of the mobile device, the information including the unique individual identification number;

locate, amongst multiple profiles stored in a system associated with the information requesting entity, a profile associated with the unique individual identification number included in the received information; and associate, the received information with the located profile associated with the unique individual identification number included in the received information,.

wherein the unique individual identification number is based on an International Mobile Equipment Identifier (IMEI) number associated with the mobile device.

10. The system as in claim 9 wherein the collected profile data is encrypted and compressed, such that the one or more servers configured to collect profile data of a user, including a phone number of a mobile device of the user, via a form displayed on a web browser are further configured to receive encrypted and compressed profile data of a user, including a phone number of a mobile device of the user, via a form displayed on a web browser.

11. The system as in claim 9 wherein the one or more servers are configured to receive information indicative of events associated with the use of the mobile device dependent upon a predetermined criteria being met.

12. The system as in claim 9 wherein the one or more servers are further configured to gain permission from the user to download the device metering software module to the mobile device.

* * * * *

UNITED STATES PATENT AND TRADEMARK OFFICE
CERTIFICATE OF CORRECTION

| | | |
|---|---|---|
| PATENT NO. | : 9,055,122 B2 | Page 1 of 1 |
| APPLICATION NO. | : 12/961092 | |
| DATED | : June 9, 2015 | |
| INVENTOR(S) | : Barbara Grecco and Ronald J. Craswell | |

It is certified that error appears in the above-identified patent and that said Letters Patent is hereby corrected as shown below:

In the Claims:

Col. 8, line 36, Claim 9, delete "information,." and insert -- information, --

Signed and Sealed this
First Day of March, 2016

Michelle K. Lee
*Director of the United States Patent and Trademark Office*